United States Patent
Li

(10) Patent No.: US 10,701,189 B2
(45) Date of Patent: Jun. 30, 2020

(54) DATA TRANSMISSION METHOD AND APPARATUS

(71) Applicant: Huawei Technologies Co., Ltd., Shenzhen (CN)

(72) Inventor: Xianming Li, Nanjing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/268,844

(22) Filed: Feb. 6, 2019

(65) Prior Publication Data
US 2019/0245948 A1 Aug. 8, 2019

(30) Foreign Application Priority Data
Feb. 7, 2018 (CN) .......................... 2018 1 0121338

(51) Int. Cl.
*H04L 29/06* (2006.01)
*H04L 29/08* (2006.01)

(52) U.S. Cl.
CPC ............ *H04L 69/16* (2013.01); *H04L 67/025* (2013.01); *H04L 67/40* (2013.01); *H04L 69/161* (2013.01); *H04L 69/163* (2013.01); *H04L 69/326* (2013.01)

(58) Field of Classification Search
CPC ....... H04L 69/16; H04L 67/025; H04L 67/40; H04L 69/161; H04L 69/163; H04L 69/326
See application file for complete search history.

(56) References Cited

U.S. PATENT DOCUMENTS

| | | | | |
|---|---|---|---|---|
| 9,294,544 | B1* | 3/2016 | Fausak | H04L 67/42 |
| 2003/0214913 | A1* | 11/2003 | Kan | H04L 43/08 |
| | | | | 370/252 |
| 2012/0227088 | A1* | 9/2012 | Gao | H04L 63/126 |
| | | | | 726/3 |
| 2013/0036192 | A1* | 2/2013 | Fausak | H04L 67/42 |
| | | | | 709/217 |
| 2014/0298021 | A1* | 10/2014 | Kwon | H04L 1/1642 |
| | | | | 713/168 |

(Continued)

OTHER PUBLICATIONS

Shakir, R., et al., "gRPC Network Management Interface (gNMI)," draft-openconfig-rtgwg-gnmi-spec-00, Network Working Group, Mar. 13, 2017, 37 pages.

(Continued)

*Primary Examiner* — Benjamin H Elliott, IV
(74) *Attorney, Agent, or Firm* — Westerman, Hattori, Daniels & Adrian, LLP

(57) ABSTRACT

A data transmission method and apparatus to separate control information and data information in a Transmission Control Protocol (TCP) protocol stack on a concentrator in order to improve data transmission efficiency. The data transmission method includes that a concentrator of a first device generates a first TCP packet based on first data that needs to be sent by a collector of the first device to a second device, where a payload of the first TCP packet is empty, the first TCP packet includes indication information, and the indication information instructs the collector to generate a second TCP packet based on the first TCP packet. The concentrator sends the first TCP packet to the collector. The collector generates the second TCP packet based on the first TCP packet and sends the second TCP packet to the second device.

20 Claims, 5 Drawing Sheets

(56) References Cited

U.S. PATENT DOCUMENTS

2015/0058446 A1\* 2/2015 Eriksson .............. H04L 65/608
 709/217
2019/0245948 A1\* 8/2019 Li ........................ H04L 67/025

OTHER PUBLICATIONS

Foreign Communication From a Counterpart Application, European Application No. 19155790.9, Extended European Search Report dated Jul. 3, 2019, 5 pages.

\* cited by examiner

DATA TRANSMISSION METHOD AND APPARATUS

CROSS-REFERENCE TO RELATED APPLICATION

This application claims priority to Chinese Patent Application No. 201810121338.0 filed on Feb. 7, 2018, which is hereby incorporated by reference in its entirety.

TECHNICAL FIELD

This application relates to the communications field, and in particularly, to a data transmission method and apparatus.

BACKGROUND

Network performance measurement needs to meet requirements such as real time and high reliability. GOOGLE Remote Procedure Call (gRPC) is an effective solution for network performance measurement launched by GOOGLE. The gRPC defines an open general-purpose remote procedure call (RPC) framework that connects distributed systems with high performance. The gRPC can efficiently connect data centers or services across data centers, and can be extended using plug-ins to provide load sharing, tracing, health checking, and authentication. The gRPC runs in client/server mode, and an application program on a client can directly call a method in an application program on a server in order to implement applications and services across distributed systems.

The Transmission Control Protocol (TCP) may be used for data transmission between a client and a server. The TCP protocol ensures reliability of data transmission using an acknowledgment and retransmission mechanism. This makes a TCP connection between each pair of client and server only able to serve the client and the server.

When a chassis switch collects data, the chassis switch may be used as a server. The chassis switch may include a plurality of collectors and a concentrator, and a TCP connection may be established between the concentrator and a client. In other approaches, performance data or statuses collected by all the collectors need to be aggregated by the concentrator before being sent together to the client. However, for this method with concentrator processing, when a quantity of collectors is large, a performance bottleneck exists when sampled data is published.

SUMMARY

This application provides a data transmission method and apparatus to separate control information and data information in a TCP protocol stack on a concentrator in order to improve data transmission efficiency.

According to a first aspect, a data transmission method is provided, where the method is performed by a first device, and the first device includes a concentrator and a collector. The concentrator generates a first TCP packet based on first data that needs to be sent by the collector to a second device, where a payload of the first TCP packet is empty, the first TCP packet includes indication information, and the indication information is used to instruct the collector to generate a second TCP packet based on the first TCP packet, where a header of the second TCP packet is the same as a header of the first TCP packet, and a payload of the second TCP packet includes the first data, the concentrator sends the first TCP packet to the collector, the collector generates a second TCP packet based on the first TCP packet, and the collector sends the second TCP packet to the second device.

In this embodiment of this application, the concentrator may generate, based on data that needs to be sent to the second device, a TCP packet whose payload is empty, and the collector encapsulates raw data into the TCP packet and sends, to the second device, a TCP packet obtained after encapsulation of the data such that control information and data information in a TCP protocol stack on the concentrator can be separated. In addition, in terms of perception of an external system (the second device), this has no difference from the other approaches in which data encapsulation is independently performed by a concentrator. That is, this embodiment of this application has no impact on an external system.

Optionally, before the concentrator determines the first TCP packet, the collector sends a first message to the concentrator, and the first message includes information about the first data.

Further, the information about the first data may represent a data characteristic of the first data but not raw data of the first data. In this way, consumption of and impact on system resources caused by copying of a large amount of data inside the device (for example, copying from the collector to the concentrator) can be reduced. That is, consumption of bandwidth of a link between the collector and the concentrator is reduced.

Optionally, the information about the first data includes a data type of the first data, a start position of the first data in a storage of the collector, and an amount of data.

The amount of data may be an amount of data corresponding to each data type. Further, the data type may be a traffic statistics result, system resource utilization, or the like. The system resource herein may be a central processing unit (CPU), a memory, a forwarding table, or the like. In this way, the concentrator can perform unified scheduling based on the information about the first data. That is, the concentrator can determine how to encapsulate data corresponding to each data type into a TCP packet.

Optionally, the indication information includes a data type and position information of the first data, where the position information includes the start position and a length of the first data in the storage of the collector, or the position information includes the start position and an end position of the first data in the storage of the collector.

In this way, after determining the data type and the position information of the first data, the collector may add the first data from a specified position in a local memory to a specified position in the first TCP packet based on a locally stored mapping relationship between data types and positions of data in the memory.

Optionally, the concentrator receives an acknowledgement (ACK) packet that is sent by the second device and that is corresponding to the second TCP packet, the concentrator sends a second message to the collector, where the second message is used to notify the collector that the concentrator has received the ACK packet, and the collector releases, based on the second message, the first data stored in the collector to avoid resource waste caused by long-time occupation of memory resources by the first data.

In this embodiment of this application, a timeout retransmission mechanism of the TCP protocol stack is the same as implementation in a current kernel, and no modification is required. To be specific, if no ACK packet is obtained after sending the second TCP packet times out, the concentrator sends the unacknowledged packet again, and content of the packet is the same as content of the previously sent packet.

That is, the first device may perform the foregoing packet sending process again in this case.

Optionally, if a TCP connection between the first device and the second device is disconnected, the concentrator sends a third message to the collector, where the third message is used to notify the collector that the TCP connection is disconnected, and the collector releases, based on the third message, the first data stored in the collector.

With the foregoing manner, resource waste caused by long-time occupation of memory resources by the first data can be avoided.

According to a second aspect, a data transmission method is provided. A collector in a first device receives a first TCP packet sent by a concentrator in the first device, where the first TCP packet is determined by the concentrator based on first data that needs to be sent by the collector to a second device, a payload of the first TCP packet is empty, and the first TCP packet includes indication information, where the indication information is used to instruct the collector to generate a second TCP packet based on the first TCP packet, a header of the second TCP packet is the same as a header of the first TCP packet, and a payload of the second TCP packet includes the first data, the collector generates the second TCP packet based on the first TCP packet, and the collector sends the second TCP packet to the second device.

In this embodiment of this application, the concentrator may generate, based on data that needs to be sent to the second device, a TCP packet whose payload is empty, and the collector encapsulates raw data into the TCP packet and sends, to the second device, a TCP packet obtained after encapsulation of the data such that control information and data information in a TCP protocol stack on the concentrator can be separated. In addition, in terms of perception of an external system (the second device), this has no difference from the other approaches in which data encapsulation is independently performed by a concentrator. That is, this embodiment of this application has no impact on an external system.

Optionally, the collector sends a first message to the concentrator, and the first message includes information about the first data.

Further, the information about the first data may represent a data characteristic of the first data but not raw data of the first data. In this way, consumption of and impact on system resources caused by copying of a large amount of data inside the device (for example, copying from the collector to the concentrator) can be reduced. That is, consumption of bandwidth of a link between the collector and the concentrator is reduced.

Optionally, the information about the first data includes a data type of the first data, a start position of the first data in a storage of the collector, and an amount of data.

The amount of data may include an amount of data corresponding to each data type. Further, the data type may be a traffic statistics result, system resource utilization, or the like. The system resource herein may be a CPU, a memory, a forwarding table, or the like. In this way, the concentrator can perform unified scheduling based on the information about the first data. That is, the concentrator can determine how to encapsulate data corresponding to each data type into a TCP packet.

Optionally, the indication information includes a data type and position information of the first data, where the position information includes the start position and a length of the first data in the storage of the collector, or the position information includes the start position and an end position of the first data in the storage of the collector.

In this way, after determining the data type and the position information of the first data, the collector may add the first data from a specified position in a local memory to a specified position in the first TCP packet based on a locally stored mapping relationship between data types and positions of data in the memory.

Optionally, the collector receives a second message sent by the concentrator, where the second message is used to notify the collector that the concentrator has received an ACK packet corresponding to the second TCP packet, and the collector releases, based on the second message, the first data stored in the collector, to avoid resource waste caused by long-time occupation of memory resources by the first data.

In this embodiment of this application, a timeout retransmission mechanism of the TCP protocol stack is the same as implementation in a current kernel, and no modification is required. To be specific, if no ACK packet is obtained after sending the second TCP packet times out, the concentrator sends the unacknowledged packet again, and content of the packet is the same as content of the previously sent packet. That is, the first device may perform the foregoing packet sending process again in this case.

Optionally, the collector receives a third message sent by the concentrator, where the third message is used to notify the collector that a TCP connection between the first device and the second device is disconnected, and the collector releases, based on the third message, the first data stored in the collector to avoid resource waste caused by long-time occupation of memory resources by the first data.

According to a third aspect, a data transmission apparatus is provided configured to perform the method according to any one of the first aspect and possible implementations of first aspect. Further, the data transmission apparatus includes a concentrator configured to perform the method according to any one of the first aspect and the possible implementations of first aspect.

According to a fourth aspect, a data transmission apparatus is provided configured to perform the method according to any one of the first aspect and the possible implementations of first aspect. Further, the data transmission apparatus includes a unit configured to perform the method according to any one of the second aspect and the possible implementations of second aspect.

According to a fifth aspect, a data transmission apparatus is provided configured to perform the method according to any one of the second aspect and the possible implementations of second aspect. Further, the data transmission apparatus includes a collector configured to perform the method according to any one of the second aspect and the possible implementations of second aspect.

According to a sixth aspect, a data transmission apparatus is provided configured to perform the method according to any one of the second aspect and the possible implementations of second aspect. Further, the data transmission apparatus includes a unit configured to perform the method according to any one of the second aspect and the possible implementations of second aspect. According to a seventh aspect, a data transmission apparatus is provided, and the data transmission apparatus includes a communications interface, a memory, a processor, and a bus system. The communications interface, the memory, and the processor are connected using the bus system. The memory is configured to store an instruction. The processor is configured to execute the instruction stored in the memory to control the communications interface to receive and/or transmit a signal. When the processor executes the instruction stored in the memory, the execution causes the processor to perform the method according to any one of the first aspect and the possible implementations of the first aspect.

According to an eighth aspect, a data transmission apparatus is provided, and the data transmission apparatus includes a communications interface, a memory, a processor, and a bus system. The communications interface, the memory, and the processor are connected using the bus system. The memory is configured to store an instruction. The processor is configured to execute the instruction stored in the memory to control the communications interface to receive and/or transmit a signal. When the processor executes the instruction stored in the memory, the execution causes the processor to perform the method according to any one of the second aspect and the possible implementations of the second aspect.

According to a ninth aspect, a computer readable medium is provided configured to store a computer program, where the computer program includes an instruction used to perform the method according to any possible implementation of any foregoing aspect.

According to a tenth aspect, a computer program product is provided, and the computer program product includes computer program code, where execution of the computer program code by a communications device (for example, a data transmission apparatus) causes the communications device to perform the method according to any possible implementation of any foregoing aspect.

DESCRIPTION OF EMBODIMENTS

The following describes technical solutions of this application with reference to the accompanying drawings.

Figure 1:
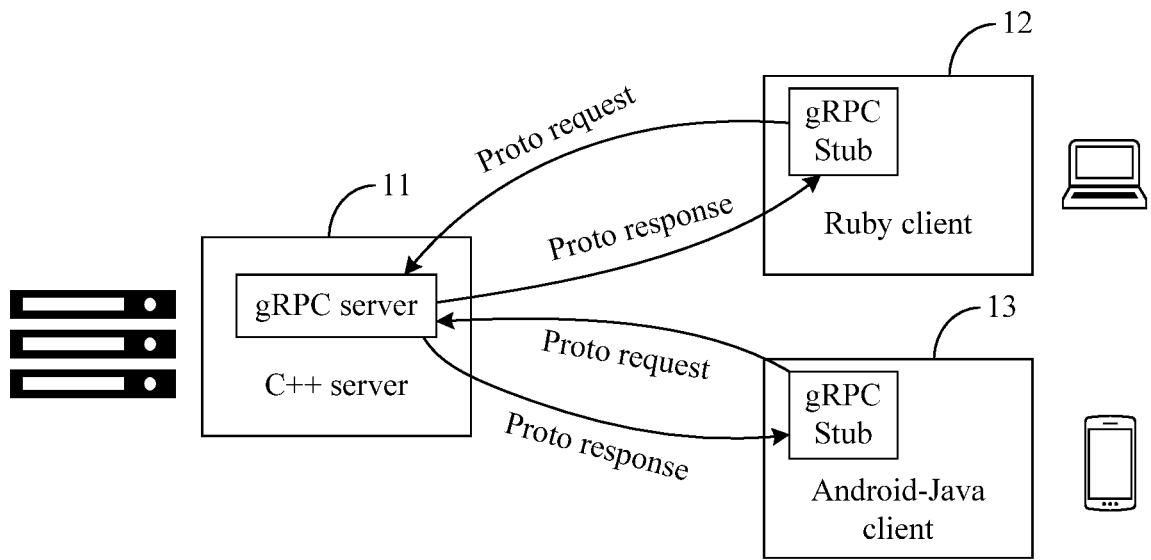
FIG. 1 is a schematic diagram of a gRPC architecture according to an embodiment of this application.

FIG. 1 is a schematic diagram of a gRPC architecture according to an embodiment of this application. The gRPC architecture includes a C++ server 11, and at least one client. FIG. 1 shows a Ruby client 12 and an Android-Java client 13. The Ruby client 12 herein may be, for example, a computer terminal, and the Android-Java client 13 herein may be, for example, a mobile phone terminal. The C++ server 11 includes a gRPC server, and the Ruby client 12 and the Android-Java client 13 each includes a gRPC stub. Further, the C++ server 11 implements a called interface and runs the gRPC server to process a call of a client service, and a client service initiating a remote call implements, using the stub, a method the same as that of the gRPC server.

Further, the gRPC architecture may be used to collect performance data. In this case, the C++ server 11 may be a network device that needs to collect data or needs to be monitored. The gRPC stubs in the Ruby client 12 and the Android-Java client 13 may each establish a gRPC protocol connection with the gRPC server. The gRPC stub in the client may send a Proto request to the gRPC server to request/subscribe to performance data or a status. After receiving the proto request, the gRPC server replies to the corresponding gRPC stub with a Proto response to release performance data or a response status.

Figure 2:
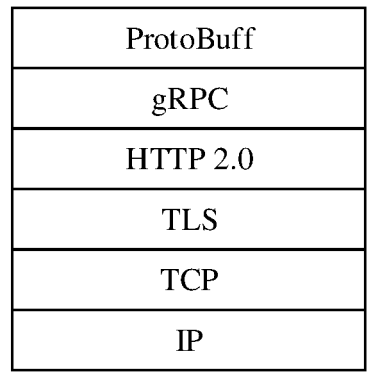
FIG. 2 is a schematic diagram of a gRPC protocol stack according to an embodiment of this application.

FIG. 2 is a schematic diagram of a gRPC protocol stack according to an embodiment of this application. From the top down, the gRPC protocol stack includes a ProtoBuff layer, a gRPC layer, a Hypertext Transfer Protocol (HTTP) 2.0 layer, a Transport Layer Security (TLS) layer, a TCP layer, and an IP layer. In the gRPC architecture, the ProtoBuff layer is used to describe service data and ProtoBuff encoded data is carried over the HTTP 2.0/TLS/TCP.

Figure 3:
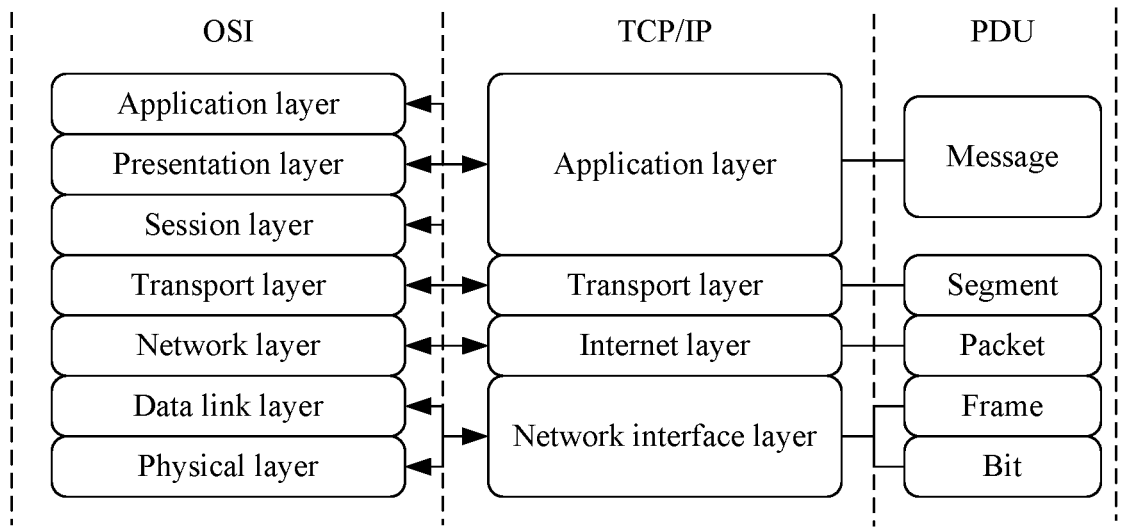
FIG. 3 is a schematic diagram of a TCP/Internet Protocol (IP) protocol stack according to an embodiment of this application.

FIG. 3 is a schematic diagram of a TCP/IP protocol stack according to an embodiment of this application. The TCP/IP protocol stack is in correspondence with a seven-layer network model defined by Open System Interconnection (OSI). Further, the TCP/IP protocol stack includes an application layer, a transport layer, an Internet layer, and a network interface layer, and the seven-layer network model defined by the OSI includes an application layer, a presentation layer, a session layer, a transport layer, a network layer, a data link layer, and a physical layer. The application layer, the presentation layer, and the session layer in OSI may be corresponding to the application layer in the TCP/IP protocol stack, the transport layer in OSI may be corresponding to the transport layer in the TCP/IP protocol, the network layer in OSI may be corresponding to the Internet layer in the TCP/IP protocol stack, and the data link layer and the physical layer in OSI may be corresponding to the network interface layer in the TCP/IP protocol stack. In addition, in the TCP/IP, a protocol data unit (PDU) at the application layer is a message, a PDU at the transport layer is a segment, a PDU at the Internet layer is a packet, and a PDU at the network interface layer is a frame and a bit.

Figure 4:
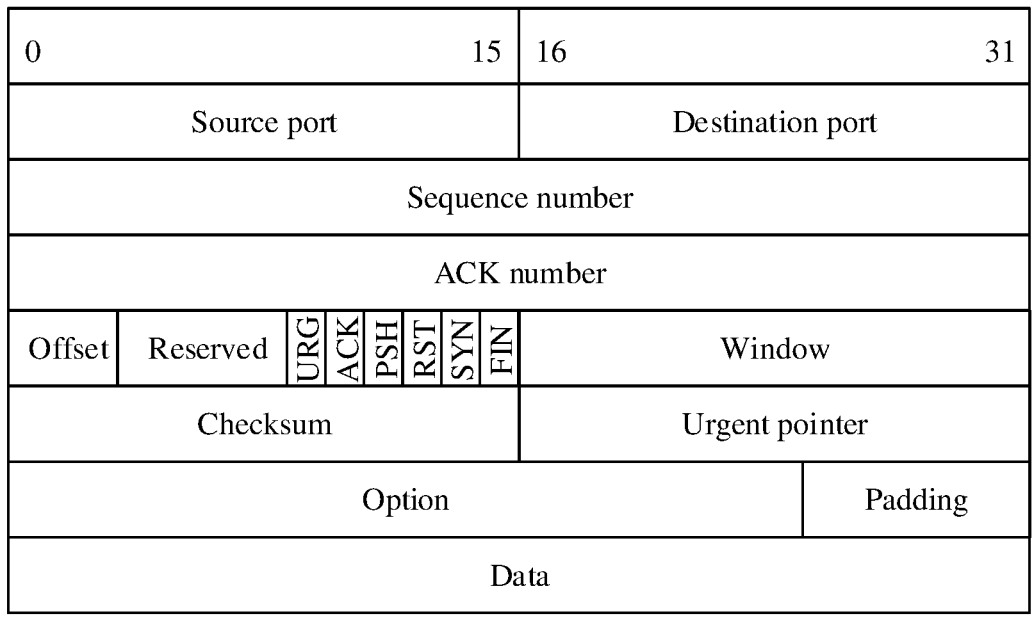
FIG. 4 is a schematic diagram of a TCP packet format according to an embodiment of this application.

FIG. 4 is a schematic diagram of a TCP packet format according to an embodiment of this application. A source port field occupies 16 bits and includes a port number for initial communication. A purpose of a source port and an IP address is to identify a return address of a packet. A destination port field occupies 16 bits. The destination port field defines a transmission destination and specifies an application interface on a recipient computer.

A sequence number field occupies 32 bits and is used to indicate a number of a first byte of a segment sent by a TCP source device to a destination device. An ACK number field also occupies 32 bits, and is used to indicate a first byte of a next segment that the destination device is expecting to receive and announce that all previous data has been received correctly. In addition, the acknowledgment number field is valid only when an ACK flag is set.

A data offset field occupies 4 bits, including a size of a TCP header. The header may include option content, and therefore a length of the TCP header is variable. The length of the header is 32 bits or 4 octets. The length of the header also indicates a start offset value of a data region in a segment.

A reserved field is a 6-bit field, with a value of 0, reserved for defining new usage in the future.

There are 6 control bits in total, and each flag bit can enable a control function.

An urgent pointer field flag (designated as URG) indicates that an urgent pointer field of the TCP packet is valid, and is used to ensure that a TCP connection is not interrupted and urge an intermediate device to process the data as soon as possible.

An ACK field flag (designated as ACK) indicates that the response field is valid when being 1, meaning that a TCP response number is included in a TCP segment, and indicates otherwise when being 0.

A push function (designated as PSH) indicates a push operation. The push operation herein means that a data packet is sent to an application program immediately after arriving at a receive end, instead of being queued in a buffer.

Reset the connection (designated as RST) is used to reset a connection on which an error occurs, and can also be used to reject an error or invalid data packet.

Synchronize sequence numbers (designated as SYN) are used to establish a connection.

FIN (No more data from sender) indicates that the transmit end has sent the end of data, and data transmission is completed. After a TCP segment containing a FIN flag bit is sent, a connection is disconnected.

A window occupies 16 bits, and represents a quantity of bytes of data, sent by a source host, that a destination host expects to receive each time.

A checksum field occupies 16 bits and is used for error check. The source host computes a checksum based on partial IP header information, a TCP header, and data content, and the destination host also performs identical computation. If there is no error in received content, the computation results obtained by the source host and the destination host should be completely identical to prove validity of data.

An urgent pointer field is an optional 16-bit pointer that points to the position of a last byte within a segment. This field is valid only when the URG flag is set.

An option field is a variable-length field of at least one byte, identifying which option (if any) is valid. If there is no option, this byte is 0, indicating the end of options. This byte being 1 indicates that no further operation is required, and this byte being 2 indicates that the next four bytes include a maximum segment size (MSS) of a source machine.

Extra 0s are added to a padding field to ensure that the TCP header is an integer multiple of 32.

It can be understood that a task of the TCP protocol is to ensure reliability of data transmission and needs to support acknowledgment and retransmission of packets. This makes a TCP connection between each pair of client and server only able to serve the client and the server. In this case, each pair of server and client has a unique matching TCP source port and destination port.

Figure 5:
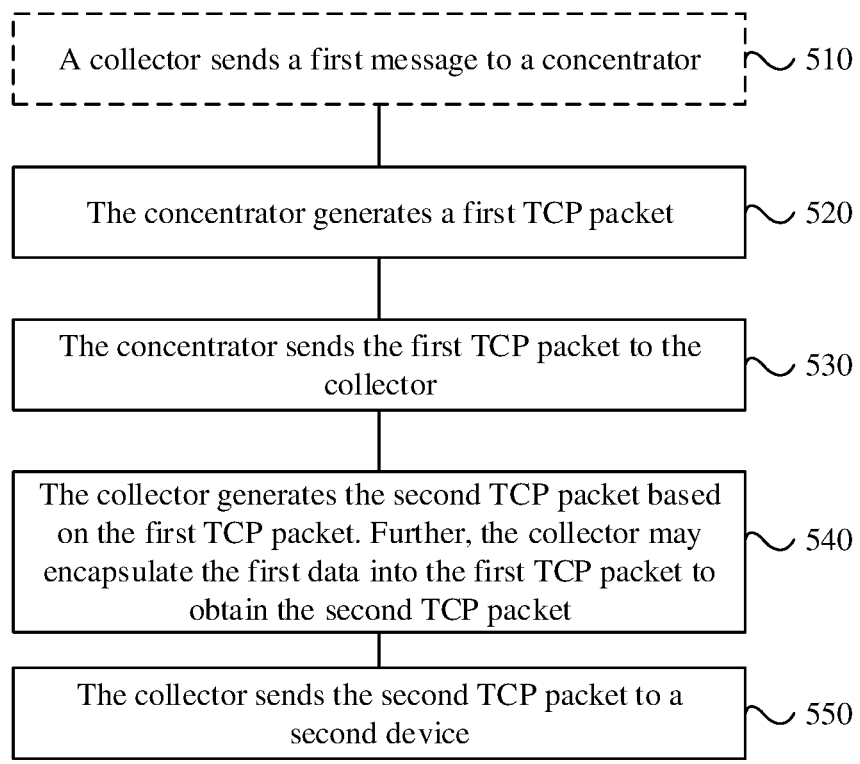
FIG. 5 is a schematic flowchart of a data transmission method according to an embodiment of this application.

FIG. 5 is a schematic flowchart of a data transmission method according to an embodiment of this application. The method is performed by a first device, and data transmission is performed between the first device and a second device through a TCP connection. The first device may be a gRPC server or a network device including a gRPC server, for example, as a chassis switch or a router. The second device may be a gRPC client or a network device including a gRPC client, for example, an analyzer.

Figure 6:
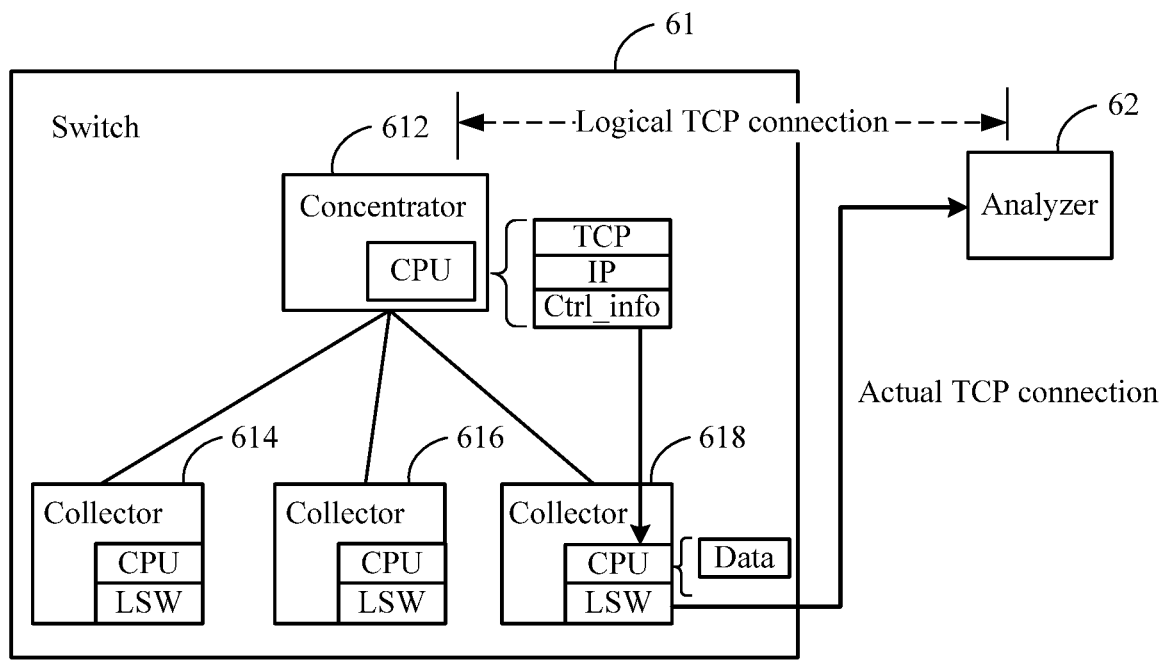
FIG. 6 is a schematic diagram of a specific gRPC architecture according to an embodiment of this application.

The data transmission method provided in this embodiment of this application may be applied to a gRPC architecture. Reference may be made to the foregoing description for the gRPC architecture. FIG. 6 is a schematic diagram of a specific gRPC architecture according to an embodiment of this application. Herein, the first device may be a switch 61 in the gRPC architecture, and the second device may be an analyzer 62 in the gRPC architecture. For ease of understanding, the following describes the data transmission method provided in this embodiment of this application using the gRPC architecture shown in FIG. 6 as an example. However, this should not be construed as any limitation on the embodiments of this application.

The gRPC architecture shown in FIG. 6 includes the switch 61 and the analyzer 62. The switch 61 may function as a gRPC server for collecting performance data. Further, the switch 61 may include a concentrator and a plurality of collectors. The collector may perform data collection, and the concentrator may process data collected by the collectors. The concentrator herein may also be referred to as a concentrating point, and generally may be a main processing unit (MPU). The collector may be a line processing unit (LPU). In addition, the MPU may also be referred to as a main control board, and the LPU may also be referred to as a service board. For example, the switch 61 in FIG. 6 includes a concentrator 612 and three collectors (a collector 614, a collector 616, and a collector 618). The concentrator 612 may perform data processing based on data collected by the three collectors.

In addition, in this embodiment of this application, the concentrator and the collectors may each include a CPU. The CPU in the concentrator may run a control information processing flow in a TCP protocol stack. The CPU in the collector may run a data information processing flow in the TCP protocol stack. It should be understood that this embodiment of this application is described using only that the processing process of the protocol stack runs on a CPU as an example, but this embodiment of this application is not limited thereto. For example, in specific implementation, the processing flow of the protocol stack may alternatively be run using a programmable device (such as a field-programmable gate array (FPGA)).

It should be understood that this embodiment of this application is described using only the gRPC architecture shown in FIG. 6 as an example, but this application is not limited thereto. For example, the gRPC architecture may further include more than one analyzer, or the switch may include more collectors.

In this embodiment of this application, the switch 61 and the analyzer 62 may establish a TCP connection and communicate with each other through the TCP connection. The TCP connection herein may be an on-demand connection. To be specific, when the switch 61 needs to send data to the analyzer 62, the switch 61 requests the analyzer 62 to establish a TCP connection. Alternatively, when the analyzer 62 needs to send data to the switch 61, the analyzer 62 requests the switch 61 to establish a TCP connection. When data transmission ends, the TCP connection between the switch 61 and the analyzer 62 may be disconnected. Alternatively, the TCP connection may be a permanent connection. To be specific, a plurality of RPCs shares one connection. In this case, after an RPC ends, the TCP connection may be retained so that a next RPC may continue to use the TCP connection.

In an implementation, the switch 61 may publicly disclose an IP address and a TCP port number, and the analyzer 62 actively establishes a TCP connection with the switch 61. In another possible implementation, the analyzer 62 publicly discloses an IP address and a TCP port number, and the switch 61 actively establishes a TCP connection with the analyzer 62.

It should be noted that in this embodiment of this application, when the switch 61 and the analyzer 62 establish a TCP connection, the IP address and the TCP port number that are used by the switch 61 are an IP address and a TCP port number of the concentrator. That is, in this embodiment of this application, the TCP connection is logically a TCP connection between the concentrator and the analyzer. In this way, an external system perceives as if the concentrator has sent the data to the analyzer.

It should be understood that in this embodiment of this application, after a TCP connection is established between the concentrator 612 and the analyzer 62, the concentrator 612 may generate a TCP packet based on data that needs to be sent by a collector to the analyzer. The concentrator sends the TCP packet to the collector. After receiving the TCP packet, the collector adds, into the TCP packet, the data that needs to be sent to the analyzer, and forwards a TCP packet obtained after the data is added, to the analyzer 62 using a forwarding chip. It can be learned that the TCP packet is actually forwarded through a concentrator-collector-analyzer physical path, and therefore the concentrator-collector-analyzer physical path may be called an actual TCP connection. The forwarding chip herein may be, for example, a local area network (LAN) switch (LSW) chip.

In an example, after generating a TCP packet based on data that needs to be sent by the collector 618 to the analyzer 62, the concentrator 612 sends the TCP packet to the collector 618. Then, the collector 618 adds the data to the TCP packet and sends, to the analyzer 62, a TCP packet obtained after the data is added. In addition, a source address of the TCP packet obtained after the data is added is the IP address and the TCP port number of the concentrator 612. This is perceived by an external system as if the concentrator 612 has sent the TCP packet obtained after the data is added to the analyzer 62. Therefore, it can be considered that a concentrator 612-collector 618-analyzer 62 physical path is an actual TCP connection, and the TCP connection between the concentrator 612 and the analyzer 62 is a logical TCP connection.

It should also be understood that the TCP connection establishment manner described in this embodiment of this application is merely used as an example, and is not intended to limit the protection scope of this embodiment of this application. In a specific implementation process, the TCP connection between the switch 61 and the analyzer 62 may alternatively be established in other manners, for which details are not described herein.

Further, in this embodiment of this application, the method shown in FIG. 5 includes steps 510 to 550.

Optionally, step 510: A collector sends a first message to the concentrator, where the first message includes information about first data that needs to be sent by the collector to a second device.

Further, the information about the first data may represent a data characteristic of the first data but not the first data itself. That is, in this embodiment of this application, when determining that the first data is to be sent to the second device, the collector needs to send only the information about the first data to the concentrator but not the first data to the concentrator.

Herein, the information about the first data may include, for example, a data type of the first data, a start position of the first data in a storage of the collector, and an amount of data. The amount of data may include an amount of data corresponding to each data type. The data type may be a traffic statistics result, system resource utilization, or the like. The system resource herein may be a CPU, a memory, a forwarding table, or the like. In this way, the concentrator can perform unified scheduling based on the information about the first data. That is, the concentrator can determine how to encapsulate data corresponding to each data type into a TCP packet.

In a specific example, when determining that first data is to be sent to the analyzer 62, the collector 618 may send only a first message to the concentrator 612, without a need to send the first data itself to the concentrator 612. The first message includes a data type of the first data that needs to be sent by the collector 618 to the analyzer 62, the start position of the first data in a storage of the collector 618, and an amount of data.

Alternatively, optionally, in some possible implementations, the collector may send raw data of the first data to the concentrator.

Step 520: The concentrator generates a first TCP packet. A payload of the first TCP packet is empty, and the first TCP packet includes indication information. The indication information is used to instruct the collector to generate a second TCP packet based on the first TCP packet. A header of the second TCP packet is the same as a header of the first TCP packet, and a payload of the second TCP packet includes the first data. That is, the collector may encapsulate the first data into the first TCP packet to generate the second TCP packet.

The concentrator may include a software module responsible for establishing a TCP connection with an external second device and maintaining a TCP/IP protocol stack of the concentrator. For example, the software module may run on a CPU. The TCP/IP protocol stack is responsible for processing all packets and state machines on a TCP/IP control plane. The software module herein may receive the first message and generate a first TCP packet based on the first message. In the first TCP packet, a source address is an IP address and a port address of the concentrator, and a destination address is an IP address and a port address of the second device. Further, for a packet format of the first TCP packet, refer to the description in FIG. 4. To avoid repetition, details are not described herein again.

It should be understood that, in this embodiment of this application, the collector may not send, to the concentrator, the raw data that needs to be sent to the analyzer. Therefore, in this case, data that needs to be encapsulated into the payload is actually stored in memories of the collectors. It can be learned that in this embodiment of this application, data collected by the collectors does not need to be sent up to the concentrator. Therefore, the TCP protocol stack on the concentrator only needs to be responsible for processing packets and state machines on the control plane, but not to be responsible for processing packets and state machines on a data plane.

Therefore, in this embodiment of this application, some functions of the TCP protocol stack on the concentrator may be offloaded to the collectors for implementation such that control information and data information in the TCP protocol stack on the concentrator are separated. In this way, consumption of and impact on system resources caused by copying of a large amount of data inside the device (for example, copying from the collector to the concentrator) can be reduced. That is, consumption of bandwidth of a link between the collector and the concentrator is reduced. In addition, impact on other message packets between the concentrator and the collector can also be reduced. The other messages herein are, for example, control messages that need to be reported to the concentrator for processing, or control messages between the concentrator and the collector.

In this case, the concentrator needs to instruct the collector to encapsulate real data using special control information (that is, the foregoing indication information). Further, the control information (or the indication information) may be a field of the first TCP packet, for example, a Ctrl_info field. This field includes information about the first data to be added to the payload of the first TCP packet.

Optionally, in this embodiment of this application, the indication information may include the data type and position information of the first data. The position information includes the start position and a length of the first data in a storage of the collector, or the position information includes the start position and an end position of the first data in a storage of the collector. In this way, after determining the data type and the position information of the first data, the collector may read the first data from a local memory based on the position information and add the first data to the payload of the first TCP packet.

In this embodiment the concentrator may determine, based on the first message sent by the collector, information about all data that needs to be sent by the collector to the second device, for example, information such as at least one data type, a start position of data, corresponding to each data type, in the storage of the collector, and an amount of data. Then, the collector performs unified planning to determine that the first data is to be sent using at least one TCP packet. For example, when a plurality of data types is included in the first data, the concentrator may encapsulate indication information of data of a same data type into one TCP packet.

In an example, when receiving a first message sent by the collector 618, the concentrator 612 may generate a first TCP packet based on the first message. For the first TCP packet, a source address is the IP address and the TCP port number of the concentrator 612, a destination address is the IP address and the TCP port number of the analyzer 62, and a payload is empty. In addition, the first TCP packet further includes a Ctrl_info field, and the Ctrl_info field is used to instruct the collector 618 to encapsulate real data. Further, the Ctrl_info field may include a data type, a start position, and a length of the first data to be encapsulated into the payload of the TCP packet.

Step 530: The concentrator sends the first TCP packet to the collector.

Further, the concentrator may send the first TCP packet to the collector using a connection between the concentrator and the collector.

Step 540: The collector generates the second TCP packet based on the first TCP packet. Further, the collector may encapsulate the first data into the first TCP packet to obtain the second TCP packet.

Further, in this embodiment of this application, the collector also has a TCP protocol stack, and the TCP protocol stack is responsible for processing packets and state machines on the data plane. Further, after receiving the first TCP packet, the collector may determine the data type and position information of the first data based on the indication information in the first TCP packet. Then, the collector reads the first data from the memory based on the position information, and encapsulates the first data into the payload of the first TCP packet to obtain the second TCP packet. That is, the payload of the second TCP packet is the first data.

In a specific example, after receiving the first TCP packet sent by the concentrator 612, the collector 618 may read, based on the data type and the position information of the first data in the Ctrl_info field of the first TCP packet, a corresponding type of data from a specified position in the local memory, and encapsulates the data into the first TCP packet to generate the second TCP packet whose payload is the first data.

Step 550: The collector sends the second TCP packet to the second device.

In a specific example, after generating the second TCP packet, the collector 618 forwards the second TCP packet to the analyzer 62 using a local LSW chip.

In this embodiment of this application, the concentrator may generate, based on data that needs to be sent to the second device, a first TCP packet whose payload is empty, and the collector encapsulates raw data into the first TCP packet and sends, to the second device, a second TCP packet obtained after encapsulation of the raw data such that control information and data information in a TCP protocol stack on the concentrator can be separated. In addition, in terms of perception of an external system (the second device), this has no difference from the other approaches in which data encapsulation is independently performed by a concentrator. That is, this embodiment of this application has no impact on an external system.

Optionally, in this embodiment of this application, the concentrator further receives an ACK packet that is sent by the second device and that is corresponding to the second TCP packet. The concentrator sends the second message to the collector, and the second message is used to notify the collector that the concentrator has received the ACK packet. The collector releases, based on the second message, the first data stored in the collector.

Further, after receiving the second TCP packet, the second device may send, to the switch, the ACK packet corresponding to the second TCP packet. Further, when the second device receives the second TCP packet, the second device cannot perceive division of labor and special processing of the concentrator and collector within the first device at all because the source address of the second TCP packet is still the IP address and the port address of the concentrator. In this case, the second device may send the ACK packet to the first device based on other approaches processing flow (that is, using an actual analyzer-collector-concentrator TCP connection). The LSW chip on the collector sends the received ACK packet whose destination IP address points to the switch (that is, the first device), up to the CPU of the concentrator for processing. This process is consistent with the other approaches processing flow.

It can be understood that when the analyzer sends the ACK packet using the actual TCP connection, the LSW chip of the collector forwards only the ACK packet, and the CPU on the collector does not obtain the ACK packet. Therefore, the collector cannot be sure whether the analyzer has received the ACK packet, and the collector cannot determine whether locally stored data (that is, the first data) that is corresponding to the second TCP packet needs to be released. Therefore, when normally receiving an ACK response, the concentrator may update a local protocol stack status. In addition, the concentrator may send the second message to the collector to notify the collector that the ACK packet has been received. The second message herein may be a separate notification message. In this way, the collector can release, based on the second message, the first data stored in the collector, to avoid resource waste caused by long-time occupation of memory resources by the first data.

In addition, in this embodiment of this application, a timeout retransmission mechanism of the TCP protocol stack is the same as implementation in a current kernel, and no modification is required. To be specific, if no ACK packet is obtained after sending the second TCP packet times out, the concentrator sends the unacknowledged packet again, and content of the packet is the same as content of the previously sent packet. That is, the first device may perform the foregoing process from step 520 to step 550 (or from step 530 to step 550) again in this case.

Optionally, the method further includes, if the TCP connection between the first device and the second device is disconnected, the concentrator sends a third message to the collector, where the third message is used to notify the collector that the TCP connection is disconnected, and the collector releases, based on the third message, the first data stored in the collector.

Further, if the TCP connection is disconnected, the concentrator may send the third message to the collector, and the third message is used to notify the collector that the TCP connection is disconnected. The third message herein may also be a separate message. In addition, disconnection of the TCP connection includes that the switch actively disconnects the connection or the analyzer actively disconnects the connection. When receiving the third message, the collector may release the first data stored in the collector. That is, when the TCP connection between the switch and the analyzer is disconnected, the collector may release the data stored in the local memory that needs to be sent to the analyzer.

Figure 7:
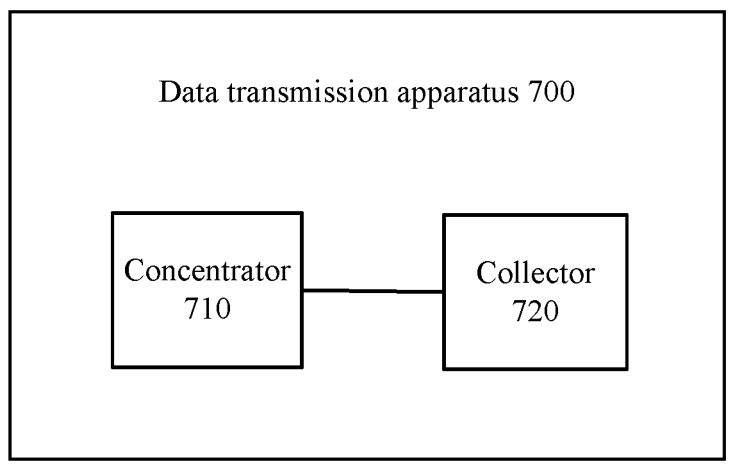
FIG. 7 is a schematic block diagram of a data transmission apparatus according to an embodiment of this application.

FIG. 7 is a schematic block diagram of a data transmission apparatus 700 according to an embodiment of this application. The apparatus 700 includes a concentrator 710 and a collector 720.

The concentrator 710 is configured to generate a first TCP packet based on first data that needs to be sent by the collector 720 to a second device, where a payload of the first TCP packet is empty, the first TCP packet includes indication information, and the indication information is used to instruct the collector 720 to generate a second TCP packet based on the first TCP packet, where a header of the second TCP packet is the same as a header of the first TCP packet, and a payload of the second TCP packet includes the first data.

The concentrator 710 is further configured to send the first TCP packet to the collector 720.

The collector 720 is configured to generate the second TCP packet based on the first TCP packet.

The collector 720 is further configured to send the second TCP packet to the second device.

In this embodiment of this application, the concentrator 710 may generate, based on data that needs to be sent to the second device, a first TCP packet whose payload is empty, and the collector 720 encapsulates raw data into the first TCP packet and sends, to the second device, a second TCP packet obtained after encapsulation of the raw data such that control information and data information in a TCP protocol stack on the concentrator can be separated. In addition, in terms of perception of an external system (the second device), this has no difference from the other approaches in which data encapsulation is independently performed by a concentrator. That is, this embodiment of this application has no impact on an external system.

Optionally, the collector 720 is further configured to send a first message to the concentrator 710, where the first message includes information about the first data that needs to be sent by the collector 720 to the second device.

Optionally, the information about the first data includes a data type of the first data, a start position of the first data in a storage of the collector 720, and an amount of data.

Optionally, the indication information includes the data type and position information of the first data, where the position information includes the start position and a length of the first data in the storage of the collector 720, or the position information includes the start position and an end position of the first data in the storage of the collector 720.

Optionally, the concentrator 710 is further configured to receive an ACK packet that is sent by the second device and that is corresponding to the second TCP packet, the concentrator 710 is further configured to send a second message to the collector 720, where the second message is used to notify the collector 720 that the concentrator 710 has received the ACK packet, and the collector 720 is further configured to release, based on the second message, the first data stored in the collector 720.

Optionally, if a TCP connection between the first device and the second device is disconnected, the concentrator 710 is further configured to send a third message to the collector 720, where the third message is used to notify the collector 720 that the TCP connection is disconnected, and the collector 720 is further configured to release, based on the third message, the first data stored in the collector 720.

Figure 8:
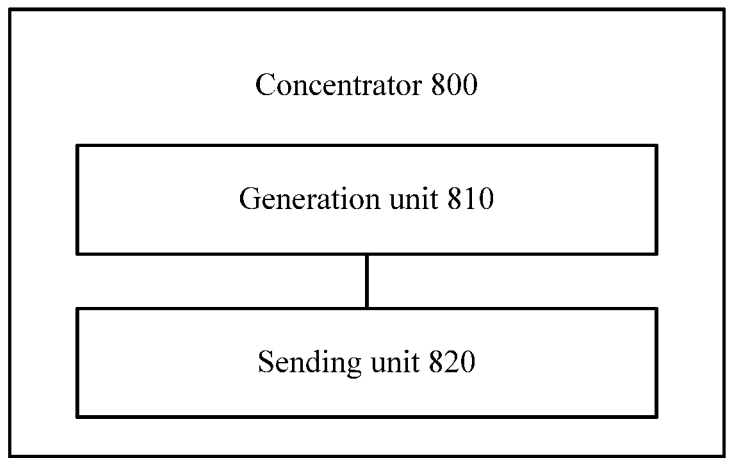
FIG. 8 is a schematic block diagram of a concentrator according to an embodiment of this application.

FIG. 8 is a schematic block diagram of a concentrator 800 for data transmission according to an embodiment of this application. Further, a first device includes the concentrator 800 and a collector. The concentrator 800 includes a generation unit 810 configured to generate a first TCP packet based on first data that needs to be sent by the collector to a second device, where a payload of the first TCP packet is empty, the first TCP packet includes indication information, and the indication information is used to instruct the collector to generate a second TCP packet based on the first TCP packet, where a header of the second TCP packet is the same as a header of the first TCP packet, and a payload of the second TCP packet includes the first data, and a sending unit 820 configured to send the first TCP packet to the collector such that the collector generates the second TCP packet and sends the second TCP packet to the second device.

In this embodiment of this application, the concentrator 800 may generate, based on data that needs to be sent to the second device, a first TCP packet whose payload is empty, and the collector encapsulates raw data into the TCP packet and sends, to the second device, a TCP packet obtained after encapsulation of the raw data such that control information and data information in a TCP protocol stack on the concentrator 800 can be separated. In addition, in terms of perception of an external system (the second device), this has no difference from the other approaches in which data encapsulation is independently performed by a concentrator. That is, this embodiment of this application has no impact on an external system.

Optionally, the concentrator 800 further includes a receiving unit (not shown) configured to receive the first message sent by the collector, where the first message includes information about the first data.

Optionally, the information about the first data includes a data type of the first data, a start position of the first data in a storage of the collector, and an amount of data.

Optionally, the indication information includes the data type and position information of the first data, where the position information includes the start position and a length of the first data in the storage of the collector, or the position information includes the start position and an end position of the first data in the storage of the collector.

Optionally, the receiving unit is further configured to receive an ACK packet that is sent by the second device and that is corresponding to the second TCP packet, the sending unit 820 is further configured to send a second message to the collector, where the second message is used to notify the collector that the concentrator has received the ACK message such that the collector releases the first data stored in the collector, thereby avoiding resource waste caused by long-time occupation of memory resources by the first data. The release includes deletion.

Optionally, if a TCP connection between the first device and the second device is disconnected, the sending unit 820 sends a third message to the collector, where the third message is used to notify the collector that the TCP connection is disconnected such that the collector releases the first data stored in the collector, thereby avoiding resource waste caused by long-time occupation of memory resources by the first data.

It should be noted that in this embodiment of the present disclosure, the generation unit 810 may be implemented by a processor, the sending unit 820 may be implemented by a communication interface, and the storage may be configured to store, for example, code for execution by the processor. Further, the processor may be configured to determine the first TCP packet based on the first data that needs to be sent by the collector to the second device, where the payload of the first TCP packet is empty, the first TCP packet includes indication information, and the indication information is used to instruct the collector to generate the second TCP packet based on the first TCP packet, where the header of the second TCP packet is the same as the header of the first TCP packet, and the payload of the second TCP packet includes the first data.

The sending unit 820 may be further configured to send the first TCP packet to the collector such that the collector generates the second TCP packet and sends the second TCP packet to the second device.

In an implementation process, steps in the foregoing method may be implemented using a hardware integrated logic circuit in the processor, or using software-form instructions. The steps of the method disclosed with reference to the embodiments of the present disclosure may be directly performed by a hardware processor, or may be performed using a combination of hardware in the processor and a software module. A software module may be located in a mature storage medium in the art, such as a random access memory (RAM), a flash memory, a read-only memory (ROM), a programmable ROM (PROM), an electrically erasable PROM (EEPROM), a register, or the like. The storage medium is located in the memory, and a processor reads information in the memory and completes the steps in the foregoing method in combination with hardware of the processor. To avoid repetition, details are not described herein again.

Figure 9:
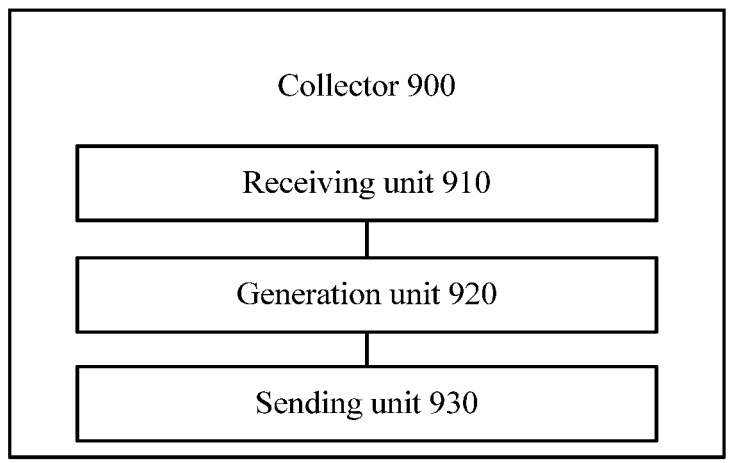
FIG. 9 is a schematic block diagram of a collector according to an embodiment of this application.

FIG. 9 is a schematic block diagram of a collector 900 according to an embodiment of this application. Further, a first device includes a concentrator and the collector 900. The collector 900 includes a receiving unit 910 configured to receive a first TCP packet sent by the concentrator, where the first TCP packet is determined by the concentrator based on first data that needs to be sent by the collector to a second device, a payload of the first TCP packet is empty, and the first TCP packet includes indication information, where the indication information is used to instruct the collector to generate a second TCP packet based on the first TCP packet, a header of the second TCP packet is the same as a header of the first TCP packet, and a payload of the second TCP packet includes the first data, a generation unit 920 configured to generate the second TCP packet based on the first TCP packet, and a sending unit 930 configured to send the second TCP packet to the second device.

In this embodiment of this application, the concentrator may generate, based on data that needs to be sent to the second device, a first TCP packet whose payload is empty, and the collector 900 encapsulates raw data into the first TCP packet and sends, to the second device, a second TCP packet obtained after encapsulation of the data such that control information and data information in a TCP protocol stack on the concentrator can be separated. In addition, in terms of perception of an external system (the second device), this has no difference from the other approaches in which data encapsulation is independently performed by a concentrator. That is, this embodiment of this application has no impact on an external system. Optionally, the sending unit 930 is further configured to send a first message to the concentrator, where the first message includes information about the first data.

Optionally, the information about the first data includes a data type of the first data, a start position of the first data in a storage of the collector 900, and an amount of data.

Optionally, the indication information includes the data type and position information of the first data, where the position information includes the start position and a length of the first data in the storage of the collector 900, or the position information includes the start position and an end position of the first data in the storage of the collector 900.

Optionally, the receiving unit 910 is further configured to receive a second message sent by the concentrator, and the second message is used to notify the collector 900 that the concentrator has received an ACK packet corresponding to the second TCP packet.

The generation unit 920 is further configured to release, based on the second message, the first data stored in the collector 900 to avoid resource waste caused by long-time occupation of memory resources by the first data.

Optionally, the receiving unit 910 is further configured to receive a third message sent by the concentrator, and the third message is used to notify the collector 900 that a TCP connection between the first device and the second device is disconnected.

The generation unit 920 is further configured to release, based on the third message, the first data stored in the collector 900 to avoid resource waste caused by long-time occupation of memory resources by the first data.

It should be noted that in this embodiment of the present disclosure, the generation unit 920 may be implemented by a processor, the receiving unit 910 and the sending unit 930 may be implemented by a communications interface, and the storage may be configured to store, for example, code for execution by the processor.

In an implementation process, steps in the foregoing method may be implemented using a hardware integrated logic circuit in the processor, or using software-form instructions. The steps of the method disclosed with reference to the embodiments of the present disclosure may be directly performed by a hardware processor, or may be performed using a combination of hardware in the processor and a software module. A software module may be located in a mature storage medium in the art, such as a RAM, a flash memory, a ROM, a PROM, an EEPROM, a register, or the like. The storage medium is located in the memory, and a processor reads information in the memory and completes the steps in the foregoing method in combination with hardware of the processor. To avoid repetition, details are not described herein again.

The apparatuses shown in FIG. 7 to FIG. 9 can implement the processes of the apparatuses and modules corresponding to the foregoing method embodiments, respectively. Further, for the data transmission apparatus 700, the concentrator 800, and the collector 900, refer to the foregoing descriptions. To avoid repetition, details are not described herein again.

An embodiment of this application further provides a computer readable storage medium, and the computer readable storage medium contains a computer program. When the computer readable storage medium runs on a computer, the computer performs the method provided in the foregoing method embodiment.

An embodiment of this application further provides a computer program product that contains an instruction. When the computer program product runs on a computer, the computer performs the method provided in the foregoing method embodiment.

It should be understood that in the embodiments of the present disclosure, the processor may be a CPU, or may be another general-purpose processor, a digital signal processor (DSP), an application-specific integrated circuit (ASIC), an FPGA or another programmable logic device, a discrete gate or a transistor logic device, a discrete hardware component, or the like. The universal processor may be a microprocessor or any conventional processor or the like.

It should also be understood that the memory in the embodiments of the present disclosure may be a volatile memory or a non-volatile memory, or may include both a volatile memory and a non-volatile memory. The non-volatile memory may be a ROM, a PROM, an erasable PROM (EPROM), and an EEPROM, or flash memory. The volatile memory may be a RAM, and the RAM is used as an external cache. For illustrative rather than limitative description, many forms of RAMs are available, for example, a static RAM (SRAM), a dynamic RAM (DRAM), a synchronous DRAM (SDRAM), a double data rate (DDR) SDRAM, an enhanced SDRAM (ESDRAM), a synchlink DRAM (SLDRAM), and a direct memory bus RAM (DR RAM).

It should be noted that, when the processor is a general-purpose processor, a DSP, an ASIC, an FPGA or another programmable logic device, a discrete gate or a transistor logic device, or a discrete hardware assembly, the memory (storage module) is integrated in the processor.

It should be noted that the memory described in this specification is intended to include, but is not limited to, these memories and any other appropriate types of memories.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

It should be understood that the descriptions of first, second, and the like in the embodiments of this application are meant only for illustration and distinguishing between described objects without conveying a meaning of order, and do not mean special limitations on quantities of devices in the embodiments of this application, and therefore do not constitute any limitation on the embodiments of this application.

It should be understood that the term "and/or" in this specification describes only an association relationship for describing associated objects and represents that three relationships may exist. For example, A and/or B may represent the following three cases, only A exists, both A and B exist, and only B exists. In addition, the character "/" in this specification indicates an "or" relationship between the associated objects.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use a different method to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, or unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be indirect couplings or communication connections via some interfaces, apparatuses, or units, and may be implemented in electronic, mechanical, or other forms.

The units described as separate parts may or may not be physically separate. Parts displayed as units may or may not be physical units, and may be located in one place or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the other approaches, or some of the technical solutions may be implemented in a form of a software product. The software product is stored in a storage medium, and includes several instructions for instructing a computer device (which may be a personal computer, a server, or a network device) to perform all or some of the steps of the method described in the embodiments of this application. The foregoing storage medium includes any medium that can store program code, such as a universal serial bus (USB) flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, wherein the data transmission method is performed by a first device, wherein the first device comprises a first processor and a second processor, and wherein the data transmission method comprises:
   generating, by the first processor, a first Transmission Control Protocol (TCP) packet based on first data that needs to be sent by the second processor to a second device, wherein a payload of the first TCP packet is empty, wherein the first TCP packet comprises indication information, wherein the indication information instructs the second processor to generate a second TCP packet based on the first TCP packet, wherein a header of the second TCP packet is the same as a header of the first TCP packet, and wherein a payload of the second TCP packet comprises the first data;
   sending, by the first processor, the first TCP packet to the second processor;
   generating, by the second processor, the second TCP packet based on the first TCP packet; and
   sending, by the second processor, the second TCP packet to the second device.

2. The data transmission method of claim 1, wherein before generating the first TCP packet, the data transmission method further comprises sending, by the second processor, a first message to the first processor, and wherein the first message comprises information about the first data.

3. The data transmission method of claim 2, wherein the information about the first data comprises a data type of the first data, a start position of the first data in a storage of the second processor, and an amount of data.

4. The data transmission method of claim 1, wherein the indication information comprises a data type and position information of the first data, and wherein the position information comprises:
   a start position and a length of the first data in a storage of the second processor; or
   the start position and an end position of the first data in the storage of the second processor.

5. The data transmission method of claim 1, further comprising:
   receiving, by the first processor, an acknowledgement (ACK) packet from the second device corresponding to the second TCP packet;
   sending, by the first processor, a second message to the second processor, wherein the second message notifies the second processor that the first processor has received the ACK packet; and
   releasing, by the second processor based on the second message, the first data stored in the second processor.

6. The data transmission method of claim 1, wherein a TCP coupling between the first device and the second device is decoupled, and wherein the data transmission method further comprises:
   sending, by the first processor, a third message to the second processor, wherein the third message notifies the second processor that the TCP coupling is decoupled; and
   releasing, by the second processor based on the third message, the first data stored in the second processor.

7. The data transmission method of claim 3, wherein the indication information comprises the data type and position information of the first data, and wherein the position information comprises:
   the start position and a length of the first data in the storage of the second processor; or
   the start position and an end position of the first data in the storage of the second processor.

8. The data transmission method of claim 3, further comprising:
   receiving, by the first processor, an acknowledgement (ACK) packet from the second device corresponding to the second TCP packet;
   sending, by the first processor, a second message to the second processor, wherein the second message notifies the second processor that the first processor has received the ACK packet; and
   releasing, by the second processor based on the second message, the first data stored in the second processor.

9. The data transmission method of claim 3, wherein a TCP coupling between the first device and the second device is decoupled, and wherein the data transmission method further comprises:
   sending, by the first processor, a third message to the second processor, wherein the third message notifies the second processor that the TCP coupling is decoupled; and
   releasing, by the second processor based on the third message, the first data stored in the second processor.

10. A data transmission apparatus, wherein the data transmission apparatus comprises a first device, and wherein the first device comprises:
    a second processor: and
    a first processor coupled to the second processor and configured to:
      generate a first Transmission Control Protocol (TCP) packet based on first data that needs to be sent by the second processor to a second device, wherein a payload of the first TCP packet is empty, wherein the first TCP packet comprises indication information, wherein the indication information instructs the second processor to generate a second TCP packet based on the first TCP packet, wherein a header of the second TCP packet is the same as a header of the first TCP packet, and wherein a payload of the second TCP packet comprises the first data; and
      send the first TCP packet to the second processor, and wherein the second processor is configured to:
        generate the second TCP packet based on the first TCP packet; and
        send the second TCP packet to the second device.

11. The data transmission apparatus of claim 10, wherein the second processor is further configured to send a first message to the first processor, and wherein the first message comprises information about the first data.

12. The data transmission apparatus of claim 11, wherein the information about the first data comprises a data type of the first data, a start position of the first data in a storage of the second processor, and an amount of data.

13. The data transmission apparatus of claim 10, wherein the indication information comprises a data type and position information of the first data, and wherein the position information comprises a start position and a length of the first data in a storage of the second processor.

14. The data transmission apparatus of claim 10, wherein the indication information comprises a data type and position information of the first data, and wherein the position information comprises a start position and an end position of the first data in a storage of the second processor.

15. The data transmission apparatus of claim 10, wherein the first processor is further configured to:

receive an acknowledgement (ACK) packet from the second device corresponding to the second TCP packet;

send a second message to the second processor, wherein the second message notifies the second processor that the first processor has received the ACK packet, and wherein the second processor is further configured to release, based on the second message, the first data stored in the second processor.

16. The data transmission apparatus of claim 10, wherein a TCP coupling between the first device and the second device is decoupled, wherein the first processor is further configured to send a third message to the second processor, wherein the third message notifies the second processor that the TCP coupling is decoupled, and wherein the second processor is further configured to release, based on the third message, the first data stored in the second processor.

17. The data transmission apparatus of claim 12, wherein the indication information comprises the data type and position information of the first data, and wherein the position information comprises the start position and a length of the first data in the storage of the second processor.

18. The data transmission apparatus of claim 12, wherein the indication information comprises the data type and position information of the first data, and wherein the position information comprises the start position and an end position of the first data in the storage of the second processor.

19. The data transmission apparatus of claim 12, wherein the first processor is further configured to:

receive an acknowledgement (ACK) packet from the second device corresponding to the second TCP packet; and send a second message to the second processor, wherein the second message notifies the second processor that the first processor has received the ACK packet, and wherein the second processor is further configured to release, based on the second message, the first data stored in the second processor.

20. The data transmission apparatus of claim 12, wherein a TCP coupling between the first device and the second device is decoupled, wherein the first processor is further configured to send a third message to the second processor, wherein the third message notifies the second processor that the TCP coupling is decoupled, and wherein the second processor is further configured to release, based on the third message, the first data stored in the second processor.

* * * * *